Sept. 18, 1956  H. A. KLUG  2,763,254
INTERNAL COMBUSTION ENGINES
Filed May 4, 1954
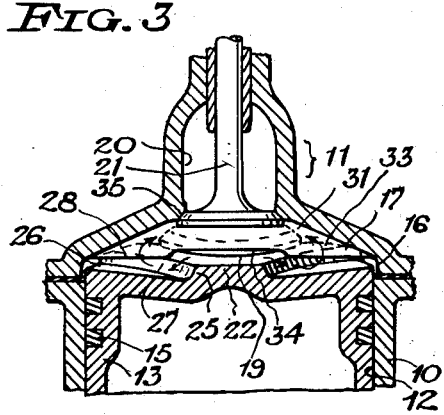
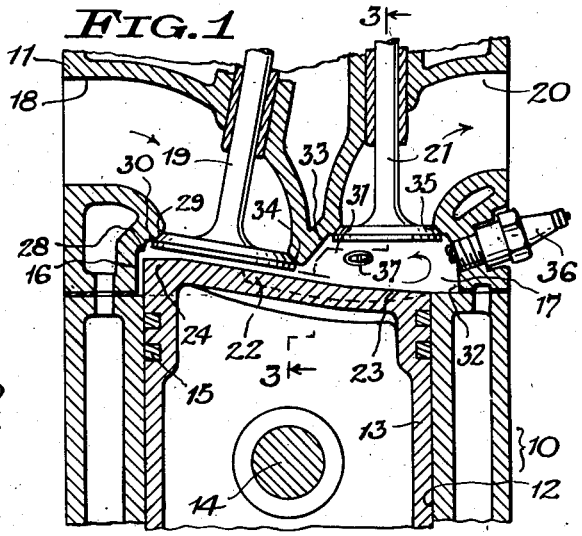
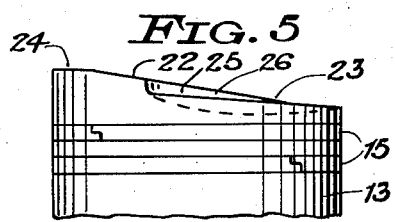
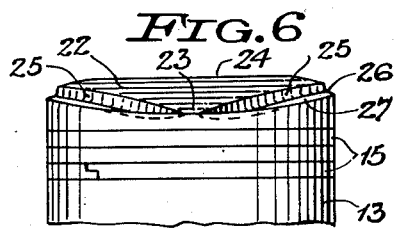
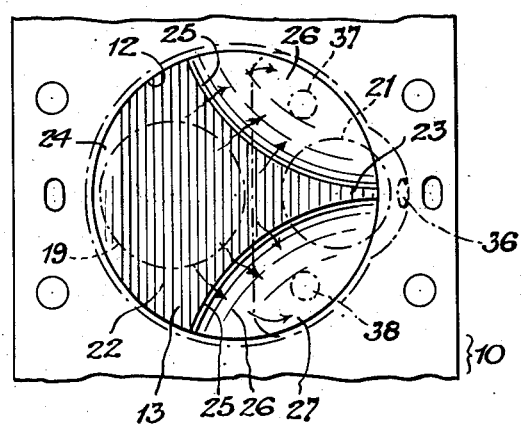
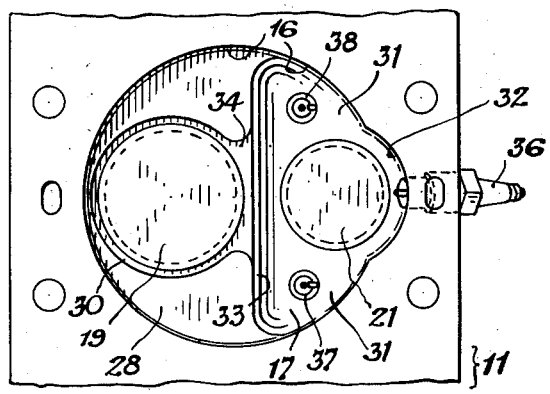
INVENTOR
HARRY A. KLUG
BY Christopher L. Wool
ATTORNEY

United States Patent Office 2,763,254
Patented Sept. 18, 1956

2,763,254

INTERNAL COMBUSTION ENGINES

Harry A. Klug, Milwaukee, Wis.

Application May 4, 1954, Serial No. 427,597

12 Claims. (Cl. 123—191)

The present invention relates to internal combustion engines of the valve-in-head type and more particularly to combustion chambers for such engines.

An object of the invention is to provide an improved form of combustion chamber for a high-compression valve-in-head engine which will control combustion in such manner as to minimize detonation and to obtain smooth and efficient engine operation.

Another object is to provide a combustion chamber which will promote turbulence of the combustible charge and regulate flame propagation.

The invention further consists in the several features hereinafter described and claimed.

In the accompanying drawing:

Fig. 1 is a vertical transverse sectional view of a valve-in-head engine embodying the invention;

Fig. 2 is a top plan view of one of the engine cylinders, parts of a superposed cylinder head being indicated in broken lines;

Fig. 3 is a vertical sectional view taken generally on the line 3—3 of Fig. 1;

Fig. 4 is a bottom plan view of the cylinder head;

Fig. 5 is a fragmentary elevational view of the piston, and

Fig. 6 is another fragmentary elevation of the piston.

In the drawing, 10 designates a cylinder block of an internal combustion engine and 11 designates a cylinder head detachably secured to the block. In the engine illustrated, the block and head are suitably jacketed to receive a cooling liquid. The cylinder block is provided with a cylinder bore 12 in which a piston 13 is reciprocable, the piston having the usual wrist pin 14 and piston rings 15. In Figs. 1 and 3 the piston is shown at the top dead center position.

The cylinder head has formed therein a stepped recess 16, the walls of which form a combustion chamber 17 with the piston head, as hereinafter more fully described. An intake passage 18 is formed in the cylinder head to conduct the fuel charge to the combustion chamber, the passage being controlled by an inwardly opening intake valve 19. An exhaust passage 20 is formed in the cylinder head to discharge products of combustion from the combustion chamber and is controlled by an inwardly opening exhaust valve 21. Preferably, the intake valve is larger in diameter than the exhaust valve.

The piston, which at top dead center projects into the cylinder head recess 16, has a head or top wall the major area of which is formed by an approximately flat inclined surface or land 22 of generally fan-like or V-like shape arranged symmetrically about a diameter of the piston, as seen in Fig. 2, the axis of symmetry of this land and the intake valve 19 being disposed in a common axial plane of the piston. The inclined surface or land slopes upwardly at a small angle, for example about 10°, from one side of the piston to the opposite side, the convergent tongue-like end portion 23 of the inclined surface being lowermost and the divergent end uppermost. The higher end of this surface may terminate at a small horizontal segment-shaped area 24 to avoid excessive thickness of metal at this portion of the piston. The opposite convergent sides of the inclined surface are bounded by concave edges or shoulders 25 forming the inner walls of recesses or pockets 26 of lenticular shape having inwardly and downwardly sloping bottom walls 27. Lengthwise of the recesses 26 the bottom walls thereof are concave. At top dead center, the tongue-like end 23 of the land 22 is approximately at the same elevation as the top face of the cylinder block.

The roof of the cylinder head recess 16 includes a generally flat inclined surface 28 of approximately semi-circular shape which is close and parallel to the inclined surface or land 22 of the piston head, the axes of symmetry of the roof surface 28 and fan-shaped land 22 lying in the same vertical plane. The clearance space formed between the surfaces 22 and 28 is fairly shallow, being of the order of one-sixteenth inch, to prevent or minimize flame propagation therein. The shallow clearance space extends under substantially the entire area of the intake valve head and at opposite sides of this valve head. Portions of the flat roof surface 28 of the cylinder head recess overlie the lenticular pockets of the piston head. The flat roof surface 28 has formed therein a valve port 29 for the intake valve 19, the port being disposed in the vertical plane of symmetry of the roof surface 28 and piston land 22 and opening into a circular counterbore 30 which is slightly larger than the valve diameter.

At its other side the cylinder head recess 16 is formed with a raised dome-like portion 31 of generally semi-circular shape in plan view having a concave side pocket 32 remote from the intake valve and further having a steeply sloping side wall 33 extending to the roof surface 28. The counterbore 30 has a throat 34 opening into the dome-like portion 31 at the sloping wall 33. The dome-like roof portion has formed therein a valve port 35 for the exhaust valve 21, the port being disposed in the vertical plane of symmetry of the flat roof portion 28. The stem of the exhaust valve extends parallel to the cylinder axis and lies in the same vertical plane as the inclined stem of the intake valve 19. The piston head recesses 26 underlie the cylinder head recess 16, mainly at the dome-like portion 31, and form part of the combustion chamber 17.

The engine is provided with suitable ignition means comprising one or more spark plugs 36, 37 and 38 which are mounted in the cylinder head at the dome-like roof portion 31, the spark plug 36 being located at the cylinder head pocket 32, and the spark plugs 37 and 38 being located in the roof of the dome-like portion 31 at opposite sides of the exhaust valve 21. The spark plug 36 may be used alone, and if dual ignition is desired, the plugs 37 and 38 may be used, or one of these latter plugs may be used in conjunction with the plug 36.

In the operation of the engine, a fuel charge is conducted into the cylinder through the intake valve 19 and is compressed on the upward stroke of the piston, the intake and exhaust valves being closed during the compression stroke. As the rising piston enters the cylinder head recess 16 and approaches its top dead center position, the charge is forced from the shallow clearance space formed between the piston head surface or land 22 and cylinder head surface 28, and flows into the domed combustion chamber section 31 and the piston head pockets 26 with a swirling motion, as indicated by arrows in Figs. 1 to 3, thus insuring turbulence and thorough mixing of the fuel charge. The ignition means will fire the charge in the domed portion 31 of the combustion chamber, exerting a driving force on the piston. The shallow clearance space will prevent or minimize flame propagation therein until this space gradually deepens on the downward stroke of the piston, thus preventing detonation and controlling the progress of the combustion. The various shoulders formed in the combustion chamber augment the turbulence of the fuel charge during compression and also control the spread of the waves propagated during combustion.

The vertical plane of symmetry of the valved combustion chamber is here shown to extend at right angles to the axis of the wrist pin, the latter being parallel to the engine crankshaft. However, it is also possible to angularly shift this vertical plane of symmetry to other positions, for example, to lie in the vertical plane of the wrist pin.

The cylinder block is normally provided with a plurality of cylinders although only one cylinder is shown.

I claim:

1. In an internal combustion engine, a cylinder, a piston reciprocable therein, a cylinder head for said cylinder presenting the roof of a combustion chamber formed between said cylinder head and the head of the piston, inwardly opening intake and exhaust valves carried by said cylinder head, said piston head having a raised surface of generally fan-like shape the longitudinal axis of which is disposed in an axial plane of the piston, said raised surface having a major area at one side of the piston head adapted to extend close to said roof at top dead center to form a shallow clearance space minimizing flame propagation therein, said shallow clearance space extending under substantially all of the head area of the intake valve, and said chamber having a deeper portion communicating with said clearance space and forming the main combustion space of said chamber.

2. In an internal combustion engine, a cylinder, a piston reciprocable therein, a cylinder head for said cylinder presenting the roof of a combustion chamber formed between said cylinder head and the head of the piston, inwardly opening intake and exhaust valves carried by said cylinder head, said piston head having a raised surface of generally fan-like shape adapted to extend close to said roof at top dead center to form a shallow clearance space minimizing flame propagation therein, said shallow clearance space extending under substantially all of the head area of the intake valve, and said chamber having a deeper portion communicating with said clearance space and forming the main combustion space of said chamber, said raised surface having a wide portion adjacent one side of the piston and having shoulder-forming side edges convergent toward the other side of the piston.

3. In an internal combustion engine, a cylinder, a piston reciprocable therein, a cylinder head for said cylinder presenting the roof of a combustion chamber formed between said cylinder head and the head of the piston, inwardly opening intake and exhaust valves carried by said cylinder head, said piston head having a raised surface of generally fan-like shape adapted to extend close to said roof at top dead center to form a shallow clearance space minimizing flame propagation therein, and said chamber having a deeper portion communicating with said clearance space and forming the main combustion space of said chamber, said raised surface having a wide portion adjacent one side of the piston and having concave shoulder-forming side edges convergent toward the other side of the piston.

4. In an internal combustion engine, a cylinder, a piston reciprocable therein, a cylinder head for said cylinder presenting the roof of a combustion chamber formed between said cylinder head and the head of the piston, inwardly opening intake and exhaust valves carried by said cylinder head, said piston head having a raised surface of generally fan-like shape adapted to extend close to said roof at top dead center to form a shallow clearance space minimizing flame propagation therein, and said chamber having a deeper portion communicating with said clearance space and forming the main combustion space of said chamber, said raised surface having a wide portion adjacent one side of the piston and having shoulder-forming side edges convergent toward the other side of the piston, and said raised surface being oblique to the cylinder axis and having its high part and wide portion adjacent to the same side of the piston.

5. In an internal combustion engine, a cylinder, a piston reciprocable therein, a cylinder head for said cylinder presenting the roof of a combustion chamber formed between said cylinder head and the head of the piston, inwardly opening intake and exhaust valves carried by said cylinder head, said piston head having a raised surface of generally fan-like shape adapted to extend close to said roof at top dead center to form a shallow clearance space minimizing flame propagation therein, and said chamber having a deeper portion communicating with said clearance space and forming the main combustion space of said chamber, said raised surface having a wide portion adjacent one side of the piston and having shoulder-forming side edges convergent toward the other side of the piston, and said piston head having a recessed portion with bottom walls sloping inwardly and downwardly toward the shoulder-forming sides of the raised surface.

6. In an internal combustion engine, a cylinder, a piston reciprocable therein, a cylinder head for said cylinder presenting the roof of a combustion chamber formed between said cylinder head and the head of the piston, inwardly opening intake and exhaust valves carried by said cylinder head, said piston head having a raised surface adapted to extend close to said roof at top dead center to form a shallow clearance space minimizing flame propagation therein, and said chamber having a deeper portion communicating with said clearance space and forming the main combustion space of said chamber, said raised surface being disposed mainly at one side of the piston and having shoulder-forming side edges convergent toward the other side of the piston, said shallow clearance space extending under substantially all of the head area of said intake valve.

7. In an internal combustion engine, a cylinder, a piston reciprocable therein, a cylinder head having a recess above the cylinder forming a combustion chamber with the head of the piston, said recess having a stepped roof including laterally adjacent first and second roof portions the latter of which forms the main combustion space with the head of the piston, the major part of said second roof portion extending directly over said piston, said first and second roof portions having respective intake and exhaust ports, intake and exhaust valves for the respective ports carried by said cylinder head and opening inwardly into the recess, said piston head projecting into said cylinder head recess when the piston is at top dead center and including a substantially flat raised surface having its major area at one side of the cylinder axis and disposed adjacent and parallel to said first roof portion to form therewith a shallow clearance space minimizing flame propagation therein, said shallow clearance space extending under substantially all of the head area of said intake valve.

8. In an internal combustion engine, a cylinder, a piston reciprocable therein, a cylinder head having a recess above the cylinder forming a combustion chamber with the head of the piston, said recess having a stepped roof including laterally adjacent first and second roof portions the latter of which forms the main combustion space with the head of the piston, said first and second roof portions having respective intake and exhaust ports, intake and exhaust valves for the respective ports carried by said cylinder head and opening inwardly into the recess, said first roof portion being oblique to the cylinder axis and having its high part at the side of said recess remote from said second roof portion, said piston head projecting into said cylinder head recess when the piston is at top dead center and having an obliquelyextending portion disposed adjacent to said first roof portion to form therewith a shallow clearance space minimizing flame propagation therein.

9. In an internal combustion engine, a cylinder, a piston reciprocable therein, a cylinder head having a recess above the cylinder forming a combustion chamber with the head of the piston, said recess having a roof including a substantially flat roof portion at one side and a deepened roof portion at the other side, said flat roof portion having an intake port and said deepened roof portion having an exhaust port, intake and exhaust valves for said respective ports carried by said cylinder head and opening inwardly into said recess, said flat roof portion being oblique to the cylinder axis and having its highest part near the side of said recess remote from said deepened roof portion, said piston head having a raised portion with a substantially flat inclined top wall parallel to said flat roof portion and disposed adjacent to said flat roof portion when the piston is at top dead center to form a shallow clearance space minimizing flame propagation therein, the main combustion space of said combustion chamber being formed under the deepened roof portion of said cylinder head recess.

10. In an internal combustion engine, a cylinder, a piston reciprocable therein, a cylinder head having a recess above the cylinder forming a combustion chamber with the head of the piston, said recess having a roof including a substantially flat roof portion at one side and a deepened roof portion at the other side, said flat roof portion having an intake port and said deepened roof portion having an exhaust port, intake and exhaust valves for said respective ports carried by said cylinder head and opening inwardly into said recess, said piston head having a substantially flat raised land parallel to said flat roof portion and disposed adjacent said flat roof portion and intake valve when the piston is at top dead center to form with said flat roof portion and intake valve a shallow clearance space minimizing flame propagation therein, the main combustion space of said combustion chamber communicating with said clearance space being formed under the deepened roof portion of said cylinder head recess, and the major part of said deepened roof portion extending directly over said piston.

11. In an internal combustion engine, a cylinder, a piston reciprocable therein, a cylinder head having a recess above the cylinder forming a combustion chamber with the head of the piston, said recess having a roof including a substantially flat roof portion at one side and a deepened roof portion at the other side, said flat roof portion having an intake port and said deepened roof portion having an exhaust port, intake and exhaust valves for said respective ports carried by said cylinder head and opening inwardly into said recess, said piston head having a substantially flat raised land of generally fan-like shape parallel to said flat roof portion and disposed adjacent said flat roof portion and intake valve when the piston is at top dead center to form with said flat roof portion and intake valve a shallow clearance space minimizing flame propagation therein, the main combustion space of said combustion chamber communicating with said clearance space being formed under the deepened roof portion of said cylinder head recess, and said piston head having a recessed portion disposed under said deepened roof portion and forming a part of the said main combustion space.

12. In an internal combustion engine, a cylinder, a piston reciprocable therein, a cylinder head for said cylinder, there being a combustion chamber between said head and said piston, said head defining a roof of said chamber and having intake and exhaust ports in said roof, intake and exhaust valves carried by said head for controlling said ports and opening inwardly into said chamber, said roof including a substantially flat surface about said intake port, the head of said piston including a substantially flat raised surface having its major area at one side of the cylinder axis and disposed in close parallel relation to said flat roof surface and intake valve when the piston is at top dead center to form a shallow clearance space minimizing flame propagation therein, said combustion chamber having a deepened portion underlying said exhaust valve and forming the major volume of the combustion chamber, and said raised surface of the piston head having opposite shoulder-forming sides converging toward the deepened portion of the combustion chamber.

References Cited in the file of this patent

UNITED STATES PATENTS

| 2,214,941 | Taub | Sept. 17, 1940 |
| 2,362,622 | Fischer | Nov. 14, 1944 |
| 2,428,886 | MacPherson | Oct. 14, 1947 |

FOREIGN PATENTS

| 660,275 | Great Britain | Aug. 26, 1948 |